(12) United States Patent
Okamoto et al.

(10) Patent No.: US 6,377,310 B1
(45) Date of Patent: Apr. 23, 2002

(54) COLOR TRANSMISSION SYSTEM DISCRIMINATION CIRCUIT IN TELEVISION SET

(75) Inventors: Naoki Okamoto; Takeshi Misaku, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/486,653

(22) PCT Filed: Jun. 21, 1999

(86) PCT No.: PCT/JP99/03305

§ 371 Date: Feb. 24, 2000

§ 102(e) Date: Feb. 24, 2000

(87) PCT Pub. No.: WO00/01162

PCT Pub. Date: Jan. 6, 2000

(30) Foreign Application Priority Data

Jun. 29, 1998 (JP) .......................................... 10-182727

(51) Int. Cl.[7] ................................................. H04N 5/46
(52) U.S. Cl. ........................................ 348/557; 348/558
(58) Field of Search ................................ 348/557, 558, 348/555, 556, 554, 553, 644, 643; H04N 5/46

(56) References Cited

U.S. PATENT DOCUMENTS 4,546,377 A * 10/1985 Kasagi et al. ............... 348/555
5,311,301 A * 5/1994 Jae-Gyun .................... 348/708
5,835,157 A * 11/1998 Miyazaki et al. ........... 348/558
5,953,072 A * 9/1999 Lim ............................ 348/555

* cited by examiner

Primary Examiner—Michael Lee
(74) Attorney, Agent, or Firm—Merchant & Gould P.C.

(57) ABSTRACT

In a receiver capable of receiving a plurality of television systems, a color transmission system discrimination circuit is provided, which is capable of exactly and rapidly determining a color transmission system which is being received. The color transmission system discrimination circuit includes: a killer state change detection circuit 23 for detecting a change in three kinds of color killer signals corresponding to a burst signal component in a 90° phase, a burst signal component in a 180° phase, and a SECAM discrimination signal; a sequencer 22 which is driven with an output signal of the killer state change detection circuit 23 and performs the first, second, and third stages in this order respectively for a predetermined period of time; first latch circuits 29 to 31 for latching the color killer signal captured in the first stage; second latch circuits 32 and 33 for latching the color killer signal captured in the second stage; and a discrimination decoder 34 for outputting a discrimination signal of a color system and a discrimination signal of a frequency of a reference sub-carrier signal, based on the color killer signal captured in the third stage and the output signals of the first and second latch circuits 29 to 33.

7 Claims, 8 Drawing Sheets

FIG. 8

COLOR TRANSMISSION SYSTEM DISCRIMINATION CIRCUIT IN TELEVISION SET

TECHNICAL FIELD

The present invention relates to a color transmission system discrimination circuit in a television receiver designed for a plurality of television systems.

BACKGROUND ART

In general, a color system or a color transmission system refers to three systems such as PAL, SECAM, and NTSC. Actually, including variations of frequencies of a reference sub-carrier signal, about 10 kinds of color transmission systems have been used in the world. A reference sub-carrier signal has 4 kinds of frequencies: 3.58 MHz in the NTSC system, 4.43 MHz in the PAL system, a frequency slightly lower than 3.58 MHz in the PAL-M system, and a frequency slightly higher than 3.58 MHz in the PAL-N system.

Recently, television receivers designed for a multi color-transmission system have been developed and put into practical use, which are capable of carrying out processing in accordance with the above-mentioned plurality of kinds of color transmission systems. Such a receiver typically is equipped with a color transmission system discrimination circuit for determining the kind of a color transmission system that is being received and automatically switching the setting of a signal processing circuit.

Japanese Laid-Open Publication No. 6-351024 describes a conventional color transmission system discrimination circuit of this kind. In this prior art, it is automatically determined which color transmission system (PAL, SECAM, NTSC, or 4.43 MHz-modulated NTSC) is being received, based on a software algorithm of a microcomputer.

According to the above-mentioned discrimination algorithm, the settings of a plurality of color transmission systems are switched in a predetermined order. After the respective settings are switched, the presence/absence of a color killer signal is detected based on information of a color killer voltage. As a result, if it is found that the set system is correct, its setting is maintained. If the setting is not correct, it is switched to the subsequent setting.

However, the above-mentioned conventional discrimination circuit has several problems. First, a color killer voltage is checked when a predetermined period of time has passed after switching the setting of a color transmission system. This processing is repeated on a color transmission system basis. Therefore, it takes a long period of time for a color transmission system to be correctly set.

Second, only one circuit is provided for detecting a color killer voltage, which makes it necessary to conduct switching between the detection of a burst signal (color signal) in a 180° phase in the NTSC system and the detection of a burst signal in a 90° phase in the PAL system. This lengthens the period of time for a color transmission system to be correctly set, and leads to a detection error in the SECAM system.

The third problem is related to the second one. That is, the third problem is difficulty in detecting more color transmission systems. For example, the SECAM system is determined by using the detection result of whether a vertical video frequency is 50 Hz or 60 Hz. However, according to this method, the SECAM system of 60 Hz cannot be determined. Actually, no countries have adopted this system as far as a ground wave is concerned. Some broadcasting stations are able to adopt a combination of their own color transmission systems, along with the widespread use of CATVs.

DISCLOSURE OF INVENTION

Under the above-mentioned circumstance, it has been desired to exactly and rapidly determine which color transmission system is being received among possible combinations of three systems: PAL, SECAM, and NTSC (four systems including monochrome broadcasting) and a frequency of a reference sub-carrier signal. The objective of the present invention is to provide such a color transmission system discrimination circuit.

In the following description, for convenience, a "color system" refers to three systems: PAL, SECAM, and NTSC (four systems including monochrome broadcasting). In a broad sense including variations of frequencies of a reference sub-carrier signal, a "color system" refers to a "color transmission system".

A color transmission system discrimination circuit of the present invention in a television receiver capable of receiving a plurality of television systems, includes: a 180° killer signal detection portion for detecting the presence/absence of a burst signal in a 180° phase and outputting a first color killer signal; a 90° killer signal detection portion for detecting the presence/absence of a burst signal in a 90° phase and outputting a second color killer signal; a SECAM killer signal detection portion for detecting the presence/absence of a SECAM signal corresponding to a SECAM system and outputting a third color killer signal; and a discrimination processing portion for determining a color system that is being received and a frequency of a reference sub-carrier signal, using the first to third color killer signals. Because of this structure, compared with a conventional discrimination method in which the PAL system and the NTSC system use a color killer signal in common, the discrimination precision is improved, and the time required for discrimination is shortened.

In a more specific structure, it is preferable that the discrimination processing portion sets a provisional color transmission system in a first stage and captures a required signal among the first, second, and third color killer signals thus obtained, sets a provisional color transmission system in the second stage, which is different from the provisional color transmission system in the first stage, and captures a required signal among the first, second, and third color killer signals thus obtained, sets a provisional color transmission system in the third stage, which is different from the provisional color transmission systems in the first and second stages, and captures a required signal among the first, second, and third color killer signals thus obtained, and determines a color system which is being received and a frequency of a reference sub-carrier signal, based on a combination of the color killer signals captured in each of the stages.

In a more specific preferable circuit configuration, the discrimination processing portion includes: a killer state change detection circuit for detecting a change in a color killer signal; a sequencer which is driven with an output signal of the killer state change detection circuit and performs the first, second, and third stages in this order respectively for a predetermined period of time; a first latch circuit for latching the color killer signal captured in the first stage; a second latch circuit for latching the color killer signal captured in the second stage; and a discrimination decoder for outputting a discrimination signal of a color system and a discrimination signal of a frequency of a reference sub-carrier signal, based on the color killer signal captured in the third stage and an output signal of the first and second latch circuits.

More preferably, the above-mentioned transmission system discrimination circuit further includes: a third latch circuit for latching a discrimination signal output from the discrimination decoder, a mode setting circuit for provisionally setting a color transmission system in each of the stages; and a switch for selecting an output of the latch circuit or an output of the mode circuit and switching the selected output to an output signal for setting a color transmission system. The switch selects an output of the mode circuit in the first to third stages, and the switch selects an output of the latch circuit in a fourth stage following the third stage. In this case, a color transmission system is set by switching based on a discrimination signal from the discrimination decoder in the fourth stage.

In the case where a discrimination signal output from the discrimination decoder represents monochrome broadcasting, it is preferable that the sequencer returns to the first stage without performing the fourth stage. According to this structure, when monochrome broadcasting is switched to color broadcasting, a discrimination result already has been output from the discrimination decoder. Therefore, a color transmission system is determined in a short period of time, and a predetermined switching of settings is conducted.

Furthermore, it is preferable that the above-mentioned color transmission system discrimination circuit includes means for, in the first to third stages, fixing a trap frequency of a trap filter circuit for removing a color signal component from a video composite signal so as to prevent disturbance of the screen and the appearance of color noise, fixing a color demodulation circuit to a PAL/NTSC circuit or a SECAM circuit, and setting a color level of the color demodulation circuit and a color amplifier at a minimum value.

Furthermore, in each of the above-mentioned structures, it is preferable that a color transmission system is provisionally set in the second stage so as to have higher priority (e.g., possibility), compared with the first stage, and a color transmission system is provisionally set in the third stage so as to have higher priority, compared with the second stage. Because of this, in the case where a color transmission system is switched at random timing, as the priority of the switched color transmission system is higher, the period of time required for discrimination and decision becomes shorter in terms of probability.

A part of the above-mentioned structure can be performed by a software program.

Best Mode for Carrying Out the Invention Hereinafter, the present invention will be described by way of illustrative embodiments with reference to the drawings.

Embodiment 1

Figure 1:
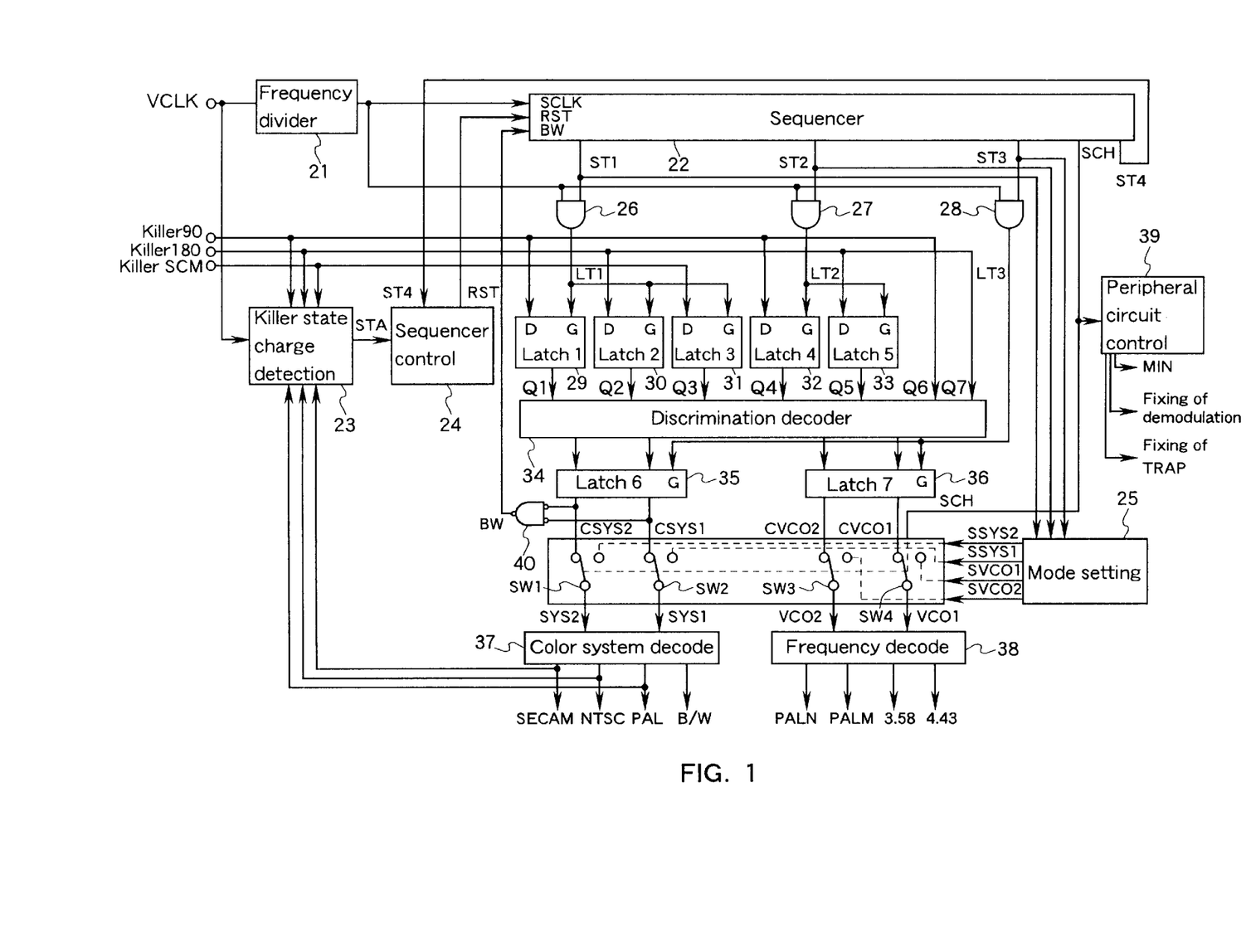
FIG. 1 is a block diagram of a color transmission system discrimination circuit in Embodiment 1 of the present invention.
Figure 2:
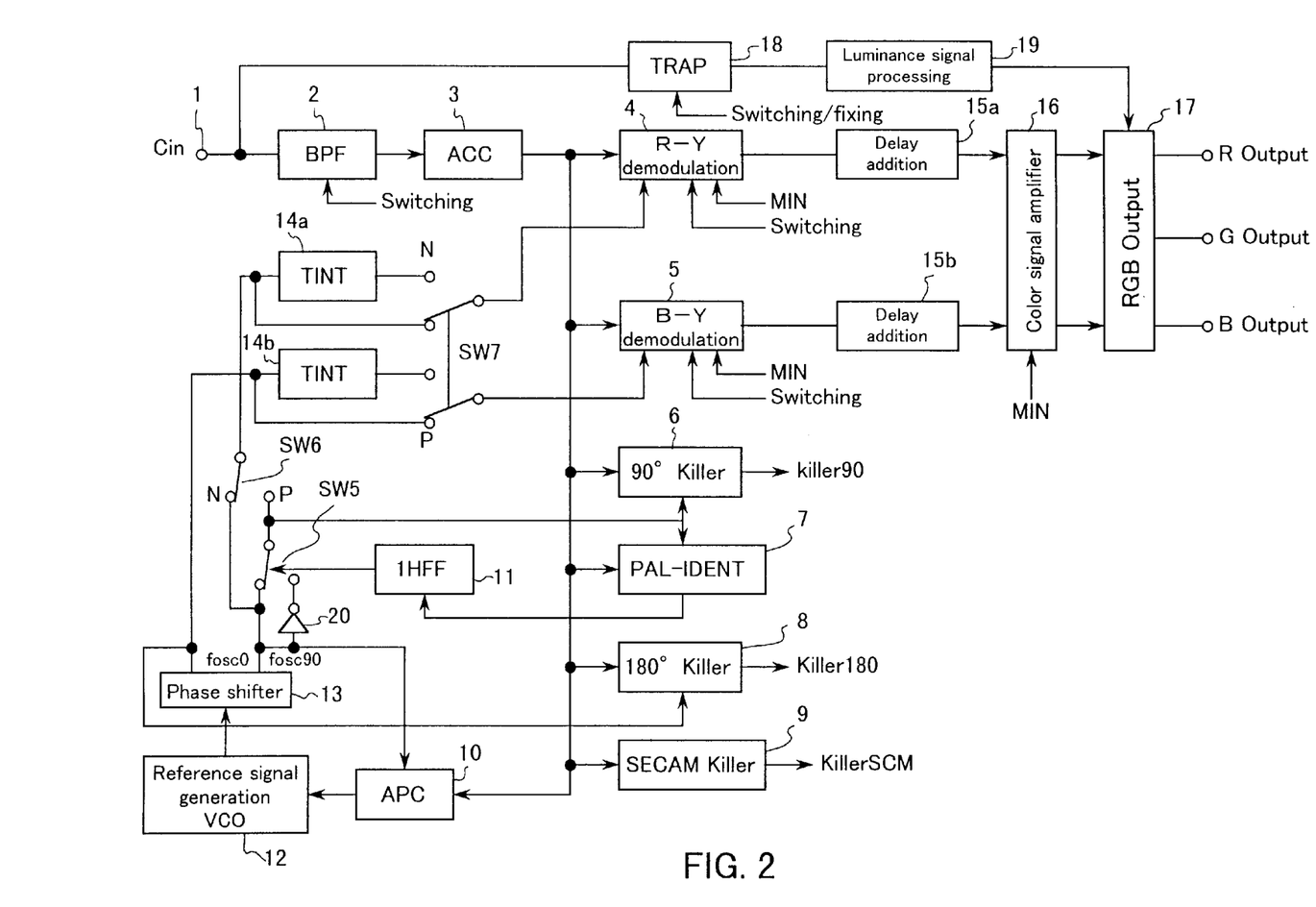
FIG. 2 is a block diagram showing a peripheral circuit of the color transmission system discrimination circuit shown in FIG. 1.

FIG. 1 is a block diagram showing a color transmission system discrimination circuit in Embodiment 1 of the present invention. FIG. 2 is a block diagram showing a peripheral circuit of the color transmission system discrimination circuit, i.e., a circuit for switching various settings in accordance with a color transmission system. First, the circuit shown in FIG. 2 will be described.

Referring to FIG. 2, a video composite signal $C_{in}$ input through an input terminal 1 is input, through a band-pass filter (BPF) 2 and an automatic color control circuit (ACC) 3, to an R-Y demodulation circuit 4, a B-Y demodulation circuit 5, a 90° killer signal detection circuit 6, a PAL-IDENT circuit 7, a 180° killer signal detection circuit 8, a SECAM killer signal detection circuit 9, and an APC circuit 10 forming a reference signal generation circuit. The BPF 2 is switched in accordance with a color transmission system; that is, one is selected from the following three: a BFP for 4.43 MHz, a BPF for 3.58 MHz, and direct passage. The ACC 3 automatically adjusts a level of a chroma signal that has passed through the BPF 2 in such a manner that the amplitude of a burst signal becomes a predetermined value.

The R-Y demodulation circuit 4 and the B-Y demodulation circuit 5 are respectively provided with a demodulation circuit for the PAL and NTSC systems and a demodulation circuit for the SECAM system for the following reason. According to the SECAM system, a color signal is frequency modulated, so that a demodulation circuit different from that for the PAL and NTSC systems is required. A demodulation circuit for either one of the systems is selected in accordance with a color transmission system.

The 90° killer signal detection circuit 6 checks if a chroma signal contains a burst signal in a 90° phase. More specifically, the 90° killer signal detection circuit 6 detects a 90° component of a burst signal, and outputs a killer 90 signal. According to the PAL system, the 90° component of a burst signal is detected, and the killer 90 signal becomes an H-level. A specific circuit configuration for detecting the presence/absence of a burst signal is well-known in the similar manner to that of the 180° killer signal detection circuit described later.

The PAL-IDENT circuit 7 generates a reset signal to be given to a 1HFF circuit 11 for synchronization between the phase inversion of a burst signal and an R-Y signal in the PAL system and the inversion of the 1HFF circuit 11. This operation of the PAL-IDENT circuit 7 will be described later together with that of the 1HFF circuit 11.

The 180° killer signal detection circuit 8 checks if a chroma signal contains a burst signal in a 180° phase. More specifically, the 180° killer signal detection circuit 8 detects a 180° component of a burst signal and outputs a killer 180 signal. According to the NTSC and PAL systems, the 180° component of a burst signal is detected, and the killer 180 signal becomes an H-level. When a monochrome signal containing no burst signal is received, a killer signal prevents color noise from appearing on a screen by suspending an operation of a color signal generation circuit. Thus, the killer signal is originally called a color killer signal.

The SECAM killer signal detection circuit 9 detects the presence/absence of a SECAM discrimination signal corresponding to a burst signal in the NTSC and PAL systems, and sets a killer SCM output signal at an H-level in the presence of a SECAM discrimination signal, and sets it at an L-level in the absence of a SECAM discrimination signal.

The APC (automatic phase control) circuit 10 forms a PLL loop together with a VCO (voltage controlled oscillator) 12 and a phase shifter 13, and generates a reference signal (reference sub-carrier signal) foscO having the same frequency and the same phase as those of a burst signal and a signal fosc90 which is advanced by 90° in phase from the signal foscO. The VCO 12 is set at one of four frequencies: 3.58 MHz, 4.43 MHz, PAL-M, and PAL-N, in accordance with a sub-carrier frequency of a color transmission system. The APC circuit 10 contains a low-pass filter (LPF).

Among two reference signals output from the phase shifter 13, the signal fosc90 is inverted by an inverter 20 to generate a signal fosc-90, i.e., a signal which is delayed by 90° in phase from the signal foscO. A switch SW5 selects either the signal fosc 90 or fosc-90 by switching. This switching is conducted by a signal output from the 1HFF circuit 11, which is inverted alternately between an H-level and an L-level on a horizontal period basis.

The 1HFF circuit 11 inverts an output signal in synchronization with the phase inversion of a burst signal and an R-Y signal, in response to a reset signal from the PAL-IDENT circuit 7 upon receiving a signal in the PAL system. The PAL-IDENT circuit 7 detects the phase of an input signal. The PAL-IDENT circuit 7 also is supplied with the signal fosc90 or fosc90, and compares the phase of the signal fosc90 or fosc-90 with that of the input signal. As a result, in the case where these phases are different from each other, the PAL-IDENT circuit 7 generates and supplies an error signal to the 1HFF circuit 11. When receiving the error signal, the 1HFF circuit 11 inverts the phase of a switching signal (which is inverted every other 1H) output to the switch SW5. In this manner, by using the loop including the switch SW5, the PAL-IDENT circuit 7, and the 1HFF circuit 11, the phase of the input signal is matched with that of the signal fosc90/fosc-90.

A signal switched to the signal fosc90 or fosc-90 on a horizontal period basis by the switch SW5 is supplied to a PAL-side input of a switch SW6, which switches between the PAL system and the NTSC system, and is input to the 90° killer signal detection circuit 6. Accordingly, the 90° killer signal detection circuit 6 can always detect a 90° component of a burst signal in the PAL system which is changed in phase alternately between 135° and 225° on a horizontal period basis. An NTSC-side input terminal of the switch SW6 is directly connected to an output terminal of the fosc90 signal of the phase shifter 13.

The output of the switch SW6, i.e., the signal fosc90 or fosc90, and the signal foscO output from the phase shifter 13 are given to the R-Y demodulation circuit 4 or the B-Y demodulation circuit 5 through TINT circuits 14a and 14b or directly without passing through them, respectively. The TINT circuits 14a and 14b change the phases of the signals foscO and fosc90 in the NTSC system to conduct color demodulation, thereby changing a color phase. The TINT circuits 14a and 14b are generally used only for the NTSC system. Thus, when the switch SW7 is switched to the NTSC-side, the signal foscO is given to the B-Y demodulation circuit 5 through the TINT circuit 14a, and the signal fosc90 is given to the R-Y demodulation circuit 4 through the TINT circuit 14b. In contrast, when the switch SW7 is switched to the PAL-side, the signal foscO is directly given to the B-Y demodulation circuit 5, and the signal fosc90 or fosc-90 is directly given to the R-Y demodulation circuit 4.

The above-mentioned reference signal is given to either one of the demodulation circuits for the PAL system and the NTSC system included in the R-Y demodulation circuit 4 and the B-Y demodulation circuit 5. The reference signals are not used in the demodulation circuit for the SECAM system.

In the case of the PAL system, the phases of a burst signal and an R-Y signal are changed on a horizontal period basis. However, since the reference signal fosc-90 or fosc-90 which is switched on a horizontal period basis is given to the R-Y demodulation circuit 4, an R-Y signal is always demodulated in the correct manner. Both in the case of the NTSC system and in the case of the PAL system, carrier color signals which are amplitude modulated with the respective frequencies are demodulated with the reference signals, and the amplitudes in the phases of the reference signals are output as color-difference signals.

The color-difference signals output from the R-Y demodulation circuit 4 and the B-Y demodulation circuit 5 are input to a color signal amplifier 16 through respective delay addition circuits 15a and 15b. Furthermore, the color-difference signals are combined with a luminance signal in an RGB output circuit 17, and three primary color signals are output. In the case of the SECAM system, the delay addition circuit 15 adds the R-Y signal and the B-Y signal alternately obtained on a horizontal period basis to signals that are delayed by one horizontal scanning period from the R-Y signal and the B-Y signal, so as to obtain the R-Y signal and the B-Y signal at all times. In the case of the PAL system, the delay addition circuit 15 removes distortion of transmission.

A luminance signal to be combined in the RGB output circuit 17 is obtained by allowing a video composite signal to pass through a trap filter circuit (TRAP) 18. The trap filter circuit 18 is a filter for removing a burst signal and a carrier color signal from a video composite signal, and a center frequency thereof is switched to a frequency equal to that of a reference sub- carrier signal in accordance with a color transmission system. Furthermore, the trap filter circuit 18 is also provided with a switch for fixing at 5.5 MHz (described later).

Figure 3:
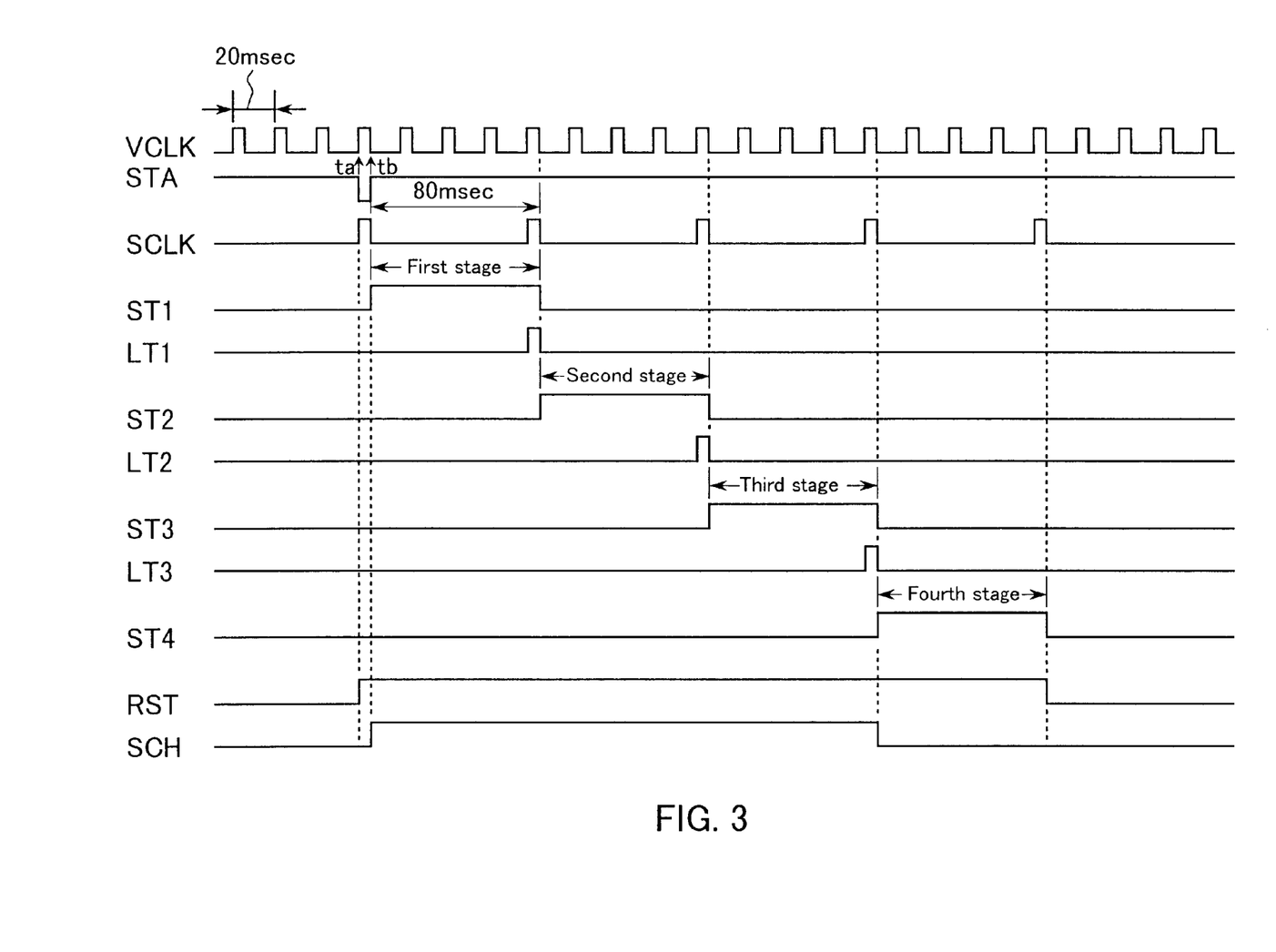
FIG. 3 is an operation timing chart of the color transmission system discrimination circuit shown in FIG. 1.

As described above, it is required to appropriately switch the BPF 2, the R-Y demodulation circuit 4, the B-Y demodulation circuit 5, the VCO for generating a reference signal 12, the switches SW5 to 7, and the like in accordance with a color transmission system. In order to automatically carry out this switching, it is required to appropriately determine the kind of a color transmission system (system and a frequency of a reference sub-carrier signal) of a television signal which is being received. The color transmission system discrimination circuit of the present invention automatically conducts the discrimination based on the killer 90 signal, the killer 180 signal, and the killer SCM signal. FIG. 1 is a block diagram showing Embodiment 1 of the present invention. FIG. 3 shows an operation timing chart of the color transmission system discrimination circuit.

The color transmission system discrimination circuit includes a sequencer 22 that successively performs predetermined processing, using a signal obtained by dividing a vertical synchronizing signal as a clock. In FIG. 1, a vertical synchronizing signal VCLK is frequency-divided by ¼ with a frequency divider 21, and is given to the sequencer 22 as a clock SCLK. As shown in FIG. 3, a pulse of the clock SCLK appears in a cycle of 80 msec obtained by frequency-dividing a vertical synchronizing signal of a frequency of 50 Hz (cycle: 20 msec) by ¼. The sequencer 22 performs the first to fourth stages based on the cycle.

Furthermore, the vertical synchronizing signal VCLK, the killer 90 signal, the killer 180 signal, and the killer SCM signal are input to a killer state change detection circuit 23. The killer state change detection circuit 23 captures the killer 90 signal, the killer 180 signal, and the killer SCM signal at a rising edge of the vertical synchronizing signal VCLK. Based on the combination results of H/L level of these signals, the killer state change detection circuit 23 outputs a start signal STA for driving the sequencer 22 and gives it to a sequencer control circuit 24. As shown in FIG. 3, as soon as a killer change is detected at timing ta, the start signal STA (L-level pulse) is output. Examples of killer state change detection will be described later.

The sequencer control circuit 24 cancels a reset signal RST (i.e., turns it high) given to the sequencer 22, based on the start signal STA. As a result, the sequencer 22 is driven at timing tb, which is a falling edge of the vertical synchronizing signal VCLK, and a first stage signal ST1 is first tuned high for 80 ms. The first stage signal ST1 is input to a mode setting circuit 25 for generating a signal for setting a provisional color transmission system as described later, and is input to an AND gate 26. The AND gate 26 outputs an AND signal LT1 of the output signal SCLK of the frequency divider 21 and the first stage signal ST1.

As shown in FIG. 3, the signal LT1 is a pulse signal generated at the end of the first stage, and is given to gates of first to third latch circuits 29 to 31. The killer 90 signal is input to a data input of the first latch circuit 29. The killer 180 signal is input to a data input of the second latch circuit 30. The killer SCM signal is input to a data input of the third latch circuit 31.

Thus, various settings in accordance with a color transmission system described with reference to FIG. 2 are conducted by a mode setting circuit 25 and the like which have received the signal ST1 at the beginning of the first stage. The resultant three kinds of killer signals are latched by the first to third latch circuits 29 to 31 at the end of the first stage. More specifically, these three kinds of killer signals are latched at the timing of the rising edge of the signal LT1. Output signals Q1 to Q3 of the latch circuits 29 to 31 are input to a discrimination decoder 34.

Next, as shown in FIG. 3, the sequencer 22 turns off (L-level) the first stage signal ST1, and thereafter, turns on (H-level) a second stage signal ST2 for 80 ms. In the same way as in an operation in the first stage, the signal ST2 is given to the mode setting circuit 25, whereby a provisional color transmission system different from that in the first stage is set. Furthermore, an AND of the second stage signal ST2 and the output signal SCLK of the frequency divider 21 is calculated at an AND gate 27, and an output signal LT2 is given to gates of fourth and fifth latch circuits 32 and 33.

The fourth latch circuit 32 latches the killer 90 signal, and gives an output Q4 to the discrimination decoder 34. The fifth latch circuit 33 latches the killer 180 signal, and gives an output Q5 to the discrimination decoder 34. In the second stage, the killer SCM signal is not latched because it is not required.

Next, as shown in FIG. 3, the sequencer 22 turns off (L-level) the second stage signal ST2, and then turns on (H-level) a third stage signal ST3 for 80 ms. The signal ST3 is sent to the mode setting circuit 25, and a provisional color transmission system different from those in the first and second stages is set. Furthermore, an AND of the third stage signal ST3 and the output signal SCLK of the frequency divider 21 is calculated at an AND gate 28, and a timing signal LT3 generated at the end of the third stage is output. The signal LT3 is input to gates of sixth and seventh latch circuits 35 and 36.

In the third stage, the killer SCM signal is not required in the same way as in the second stage, and only the killer 90 signal and the killer 180 signal are captured. These killer signals are directly input to the discrimination decoder 34 as outputs Q6 and Q7. The discrimination decoder 34 conducts decode processing as described later, based on the latch signals Q1, Q2, and Q3 of the killer signals obtained in the first stage, the latch signals Q4 and Q5 of the killer signals obtained in the second stage, and the killer signal directly input in the third stage, and outputs four signals. Among these, two decode outputs corresponding to discrimination results regarding a color system are input to the sixth latch circuit 35, and two decode outputs corresponding to discrimination results regarding to a frequency are input to the seventh latch circuit 36.

The sixth and seventh latch circuits 35 and 36 latch and output the signals from the discrimination decoder 34 at the rising edge of the signal LT3 input to their gates. Four latch signals CSYS1, CSYS2, CVCO1, and CVCO2 are given to one switching terminal of each of switches SW1 to SW4. The outputs SSYS1, SSYS2, SVCO1, and SVCO2 of the mode setting circuit 25 are given to the other switching terminals of the switches SW1 to SW4. Common terminals are connected to inputs SYS1 and SYS2 of a color system decode circuit 37, and inputs VCO1 and VCO2 of a frequency decode circuit 38.

Next, as shown in FIG. 3, the sequencer 22 turns off (L-level) the third stage signal ST3. Then, the sequencer 22 turns on (H-level) a fourth stage signal ST4 for 80 ms, and changes a control signal SCH of the switches SW1 to SW4 from an H-level to an L-level. Thus, the connection of the switches SW1 to SW4 is switched from SSYS1, SSYS2, SVCO1, and SVCO2 on the side of the mode setting circuit 25 to CSYS1, CSYS2, CVCO1, and CVCO2 on the side of the latch circuits 35 and 36.

In this way, the decode outputs of the discrimination decoder 34, i.e., the color transmission system discrimination results are transmitted to the sixth and seventh latch circuits 35 and 36, and the color system decode circuit 37 and the frequency decode circuit 38 through the switches SW1 to SW4. The color system decode circuit 37 and the frequency decode circuit 38 respectively decode two input signals, and output four types of color systems or VCO frequencies.

The decode output of the color system decode circuit 37 is supplied to the switches SW6 and SW7, the R-Y demodulation circuit 4, and the B-Y demodulation circuit 5 in FIG. 2. In the case where the color system is determined to be the PAL system, the switches SW6 and SW7 are connected to the P-side, and signal processing in the PAL system is conducted. In the case where the color system is determined to be the NTSC system, the switches SW6 and SW7 are connected to the N-side, and signal processing in the NTSC system is conducted. Furthermore, in the case where the color system is determined to be the SECAM system, the R-Y demodulation circuit 4 and the B-Y demodulation circuit 5 are set at SECAM signal processing, whereby signal processing in the SECAM system is conducted. In the case where the color system is determined to be B/W, the operations of the R-Y demodulation circuit 4 and the B-Y demodulation circuit 5 are suspended so that a color signal will not be output. The decode output of the frequency decode circuit 38 is connected to the reference signal generation circuit VCO 12 in FIG. 2 in such a manner that a frequency (4.43 MHz, 3.58 MHz, PAL-M, PAL-N) based on the frequency discrimination results is output. Thus, a demodulation circuit of a color transmission system based on discrimination results is formed, and a predetermined color signal can be demodulated.

As shown in FIG. 3, the switching signal SCH is at an H-level in the first to third stages, during which the switches SW1 to SW4 are switched to an output side of the mode setting circuit 25. Thus, a setting of a provisional color transmission system conducted in each stage, using the mode setting circuit 25 becomes effective. In the fourth stage, the switching signal SCH becomes an L-level as described above, and a setting of a color transmission system by a discrimination output of the discrimination decoder 34 becomes effective.

The switching signal SCH also is given to a peripheral circuit control circuit 39. The peripheral circuit control circuit 39 fixes a trap frequency of the TRAP circuit 18 shown in FIG. 2 at 5.5 MHz in the first to third stages where the switching signal SCH is at an H-level. The peripheral circuit control circuit 39 fixes the R-Y demodulation circuit 4 and the B-Y demodulation circuit 5 for the PAL/NTSC system, and fixes a color level of the R-Y demodulation circuit 4, the B-Y demodulation circuit 5, and the color signal amplifier 16 at a MIN (minimum) level. This prevents a provisional setting of a system from causing disturbance of a screen or the appearance of color noise during discrimination of a color transmission system, i.e., during a period of time until a color transmission system being received is correctly determined. The R-Y demodulation circuit 4 and the B-Y demodulation circuit 5 may be fixed for the SECAM system.

As shown in FIG. 1, the fourth stage signal ST4 is input to the sequencer control circuit 24. The sequencer control circuit 24 returns the RST signal to an H-level at a falling edge of the fourth stage signal ST4 at the completion of the fourth stage, thereby suspending the operation of the sequencer 22.

The sequencer 22 performs the first to fourth stages in this order as described above. However, in the case where a signal corresponding to the color system discrimination results from the discrimination decoder 34 represents monochrome broadcasting, the sequencer 22 repeats the first to third stages. As described later, the case where both the outputs from the sixth latch 35 are at an L-level corresponds to monochrome broadcasting. In this case, an output BW of a NAND circuit 40 becomes an L-level. Otherwise, the output BW becomes an H-level. The BW signal is input to the sequencer 22. When the BW signal is at an L-level, the sequencer 22 returns to the first stage without shifting from the third stage to the fourth stage, and repeats the first to third stages.

While the sequencer 22 repeats the first to third stages, as described above, the switching signal SCH is at an H-level, the TRAP circuit 18 and the like are fixed, and a color level is set at a minimum value. Therefore, there is no problem in terms of display of a monochrome image. When monochrome broadcasting is switched to color broadcasting, a color transmission system is determined within the shortest period of time, and predetermined switching of settings can be conducted, because discrimination results have already been output from the discrimination decoder 34.

Figure 4:
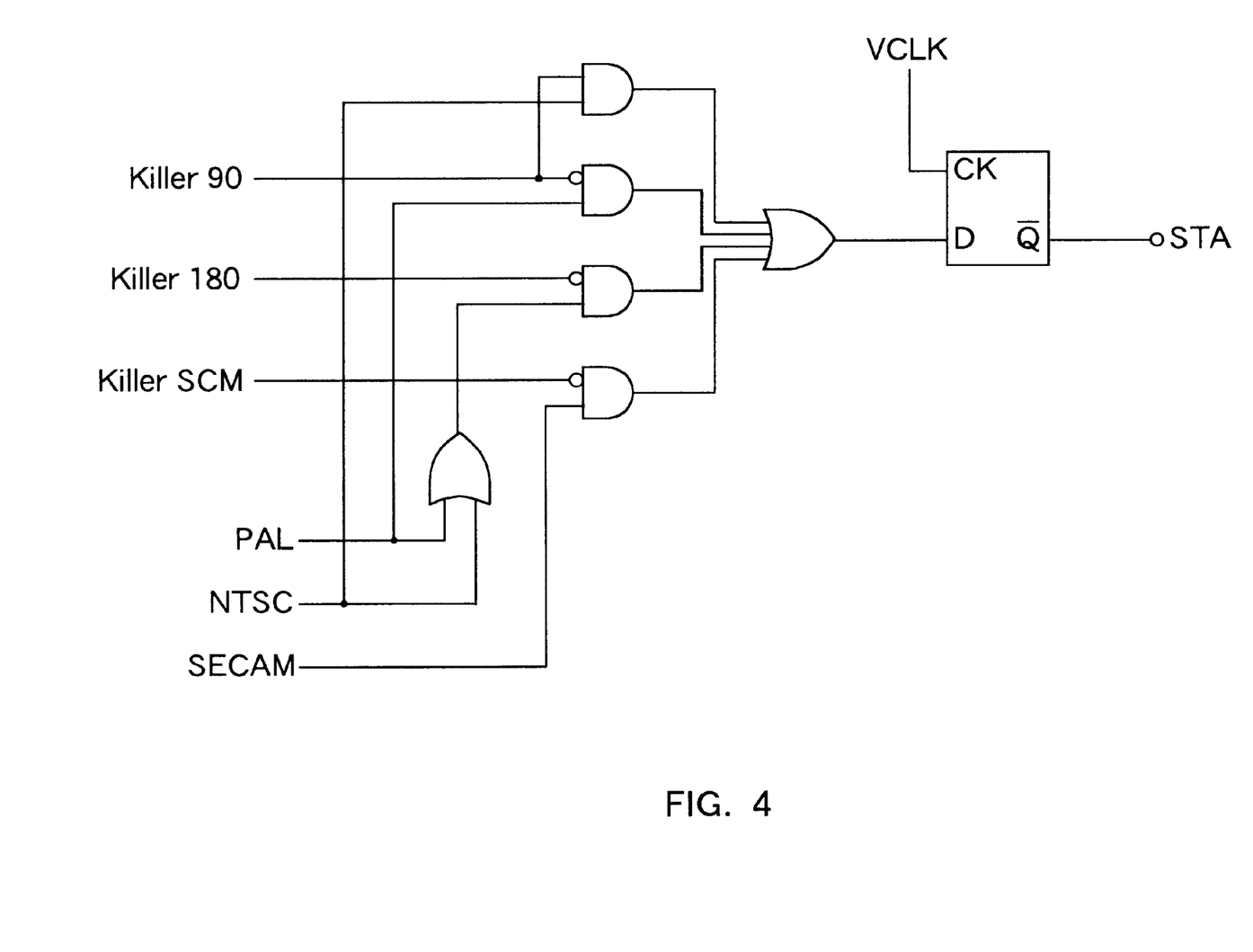
FIG. 4 is a circuit diagram showing an example of a killer state change detection circuit forming the color transmission system discrimination circuit shown in FIG. 1.

Next, the specific structure and operation of each portion shown in FIG. 1 will be described. First, the killer state change detection circuit 23 detects a killer state (i.e., that a color transmission system which is being received is changed), based on the current discrimination signal (SECAM, NTSC, or PAL) of a color transmission system supplied from the color system decode circuit, the killer 90 signal, the killer 180 signal, and the killer SCM signal, and outputs a start signal STA of a discrimination sequence. FIG. 4 shows an example of the killer state change detection circuit 23.

The killer 90 signal and the killer 180 signal are detected in the PAL and NTSC systems. Furthermore, the killer SCM signal is detected only in the SECAM system. Thus, a change from the PAL system to the NTSC, SECAM, or monochrome broadcasting is detected by checking a change from an H-level to an L-level of the killer 180 signal, as well as a change from an H-level to an L-level of the killer 90 signal. A change from the NTSC system to PAL, SECAM, or monochrome broadcasting is detected by checking a change from an H-level to an L-level of the killer 180 signal, as well as a change from an L-level to an H-level of the killer 90 signal. A change from the SECAM system to PAL, NTSC, or monochrome broadcasting is detected by checking a change from an H-level to an L-level of the killer SCM signal.

The circuit shown in FIG. 4 is designed in such a manner that an output is changed from an L-level to an H-level at the timing of the rising edge of the vertical synchronizing signal VCLK in accordance with a change in the killer signal by the above-mentioned checking. Thus, the killer state change detection circuit allows a discrimination sequence to be started only when discrimination of a color transmission system is required. Therefore, there is less possibility of error discrimination.

Next, an example of discrimination of a color transmission system will be described. For example, in television receivers for the European countries, regarding a color system, it is required to determine a color transmission system among four types: PAL, NTSC, SECAM, and monochrome broadcasting. Regarding a frequency, it is required to determine whether a frequency is 3.58 MHz or 4.43 MHz. For example, the SECAM system at 4.43 MHz is set in the first stage, the PAL system at 3.58 MHz is set in the second stage, and the PAL system at 4.43 MHz is set in the third stage. In this case, the relationship between the inputs Q1 to Q7 of the discrimination decoder 34 and the color system being received is as shown in Table 1.

TABLE 1

| Q1 | Q2 | Q3 | Q4 | Q5 | Q6 | Q7 | Color system |
|----|----|----|----|----|----|----|--------------|
| *  | *  | *  | *  | *  | H  | H  | PAL          |
| *  | *  | *  | *  | *  | L  | H  | NTSC         |
| *  | *  | *  | H  | H  | *  | L  | PAL          |
| *  | *  | *  | L  | H  | *  | L  | NTSC         |
| H  | H  | *  | *  | L  | *  | L  | PAL          |
| L  | H  | *  | *  | L  | *  | L  | NTSC         |
| *  | *  | H  | *  | L  | *  | L  | SECAM        |

In Table 1, the symbol (*) means that checking is not required. This also applies to the discrimination tables shown below. Among the outputs of the discrimination decoder 34, CSYS1 and CSYS2, which are discrimination results of a color system, represent four types of color systems by their combinations as shown in Table 2.

TABLE 2

| CSYS2 | CSYS1 | Color system |
|---|---|---|
| L | L | Monochrome |
| L | H | PAL |
| H | L | NTSC |
| H | H | SECAM |

Figure 5:
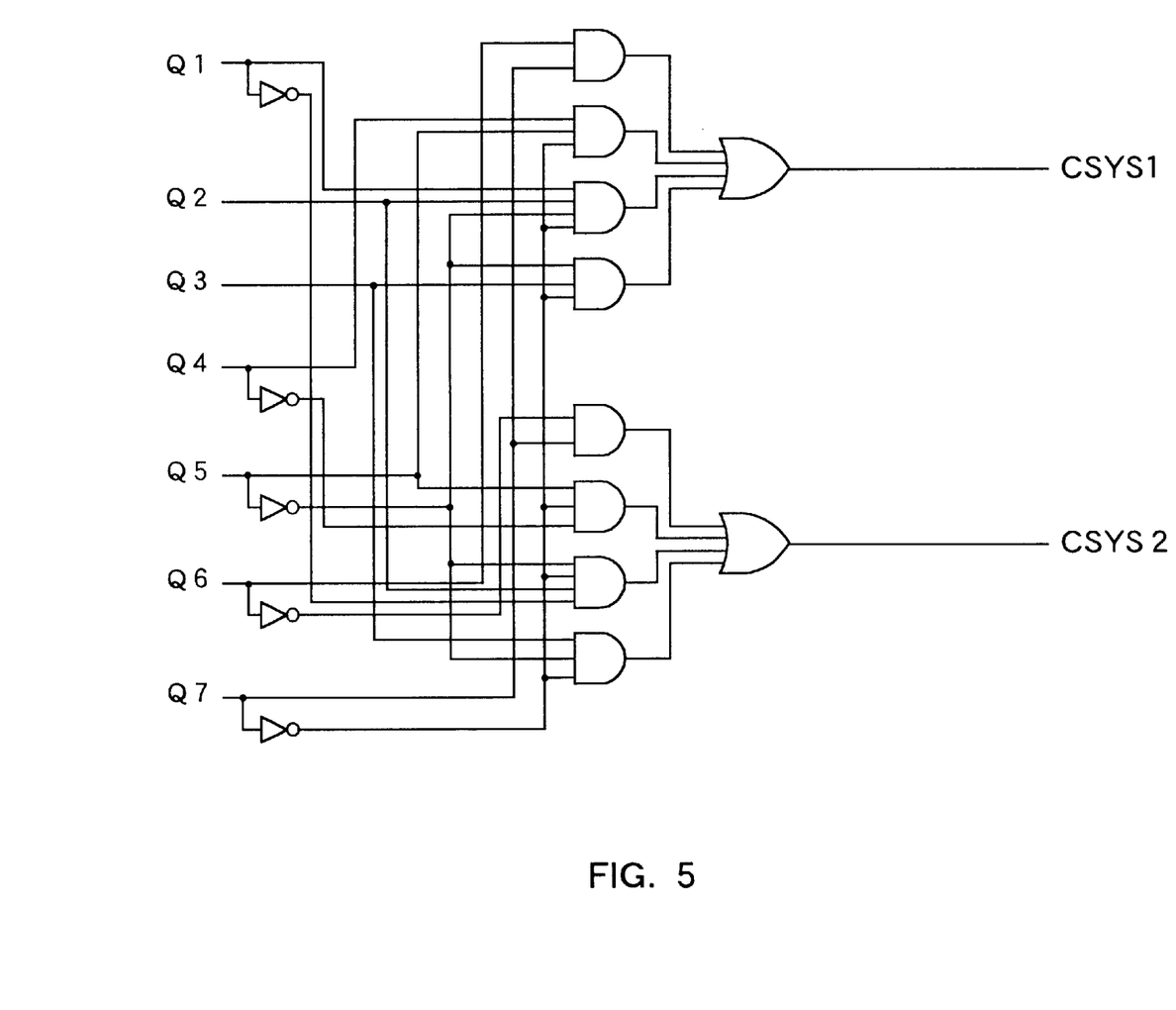
FIG. 5 is a circuit diagram showing an example of a color system discrimination decode circuit included in a discrimination decoder forming the color transmission system discrimination circuit shown in FIG. 1.

FIG. 5 shows an example of a decode circuit that outputs signals of the combinations shown in Table 2 based on Table 1, using the input signals Q1 to Q7.

A frequency can be determined based on the combinations shown in Table 3, using the killer 180 signal.

TABLE 3

| Q2 | Q5 | Q7 | Frequency |
|---|---|---|---|
| * | L | L | RET |
| * | H | L | 3.58 MHz |
| * | L | H | 4.43 MHz |
| * | H | H | 4.43 MHz |

In Table 1, RET means that the sequencer 22 puts discrimination on hold, and returns to the first stage. This also applies to Tables 5 and 6 shown below. Among the outputs of the discrimination decoder 34, CVCO1 and CVCO2, which are discrimination results of a frequency, represent four types of frequencies by four combinations as shown in Table 4.

TABLE 4

| CVCO2 | CVCO1 | Frequency |
|---|---|---|
| L | L | 4.43 MHz |
| L | H | 3.58 MHz |
| H | L | PAL-M |
| H | H | PAL-N |

Frequencies of PAL-M and PAL-N are not required for television receivers for the European countries. An example of a decode circuit that outputs signals of combinations shown in Table 4 based on Table 3 can be commonly used in television receivers for the South America, as described below.

In the case of television receivers for the South America, a color system can be determined in the same way as in the television receivers for the European countries. However, it is required to determine a frequency among four types shown in Table 4. For example, the PAL system at the PAL-M frequency is set in the first stage, the PAL system at the PAL-N frequency is set in the second stage, and the PAL system at 3.58 MHz is set in the third stage. At this time, the relationship between Q2, Q5, and Q7, which have captured the killer 180 signal, and the frequencies is as shown in Table 5.

TABLE 5

| Q2 | Q5 | Q7 | Frequency |
|---|---|---|---|
| L | L | L | RET |
| H | L | L | PAL-M |
| L | H | L | PAL-N |
| H | H | L | PAL-N |
| L | L | H | 3.58 MHz |
| H | L | H | 3.58 MHz |
| L | H | H | 3.58 MHz |
| H | H | H | 3.58 MHz |

Table 6 shows a discrimination table which summarizes Table 3 (for the European countries) and Table 5 (for the South America).

TABLE 6

| CMODE | Q2 | Q5 | Q7 | Frequency |
|---|---|---|---|---|
| L | * | L | L | RET |
| L | * | H | L | 3.58 MHz |
| L | * | L | H | 4.43 MHz |
| L | * | H | H | 4.43 MHz |
| H | L | L | L | RET |
| H | H | L | L | PAL-M |
| H | L | H | L | PAL-N |
| H | H | H | L | PAL-N |
| H | L | L | H | 3.58 MHz |
| H | H | L | H | 3.58 MHz |
| H | L | H | H | 3.58 MHz |
| H | H | H | H | 3.58 MHz |

Figure 6:
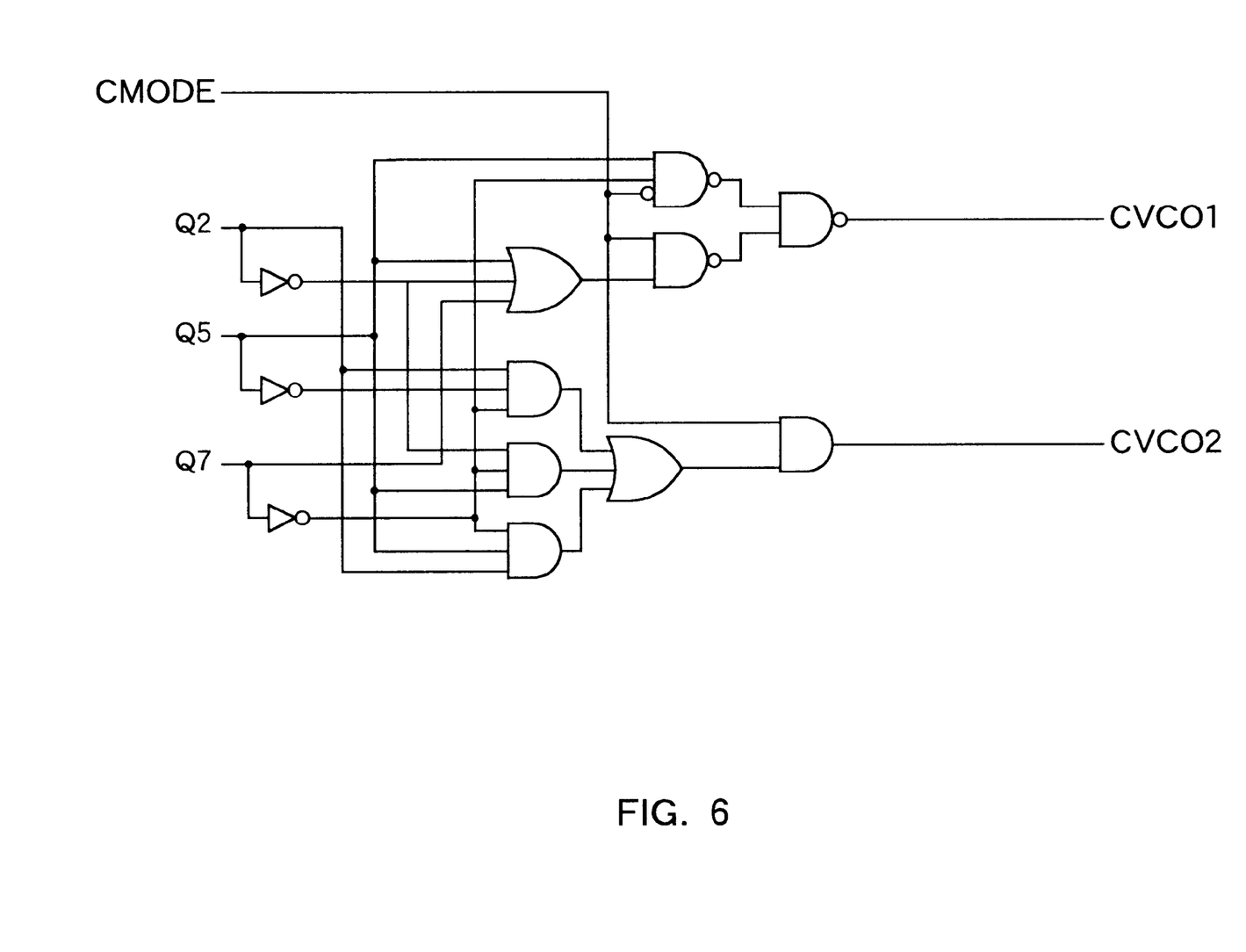
FIG. 6 is a circuit diagram showing an example of a frequency discrimination decode circuit included in a discrimination decoder forming the color transmission system discrimination circuit shown in FIG. 1.

In Table 6, CMODE represents a switching signal for the European countries or South America; L is for the European countries and H is for South America. FIG. 6 shows an example of a decode circuit that outputs signals of combinations shown in Table 4 based on Table 6, using signals Q2, Q5, and Q7.

It is preferable that color transmission systems provisionally set in the first, second, and third stages are set in ascending order of priority (e.g., possibility) as described in the above example. In other words, a color transmission system of highest priority is set in the third stage. Accordingly, in the case where a color transmission system is switched at random timing, as the priority of a switched color transmission system is higher, the period of time for discrimination and decision becomes shorter in terms of probability.

In the above-described embodiment, although the decode circuit is composed of hardware, it may be composed of software in place of hardware, which will be described in the following embodiment.

Embodiment 2

In a color transmission system discrimination circuit in Embodiment 2 of the present invention, discrimination is performed by using a software program. Provisional color transmission systems are successively set in three stages, and a color transmission system is determined based on three killer signals thus obtained. This is the same as that in Embodiment 1. The present embodiment will be described with reference to flow charts in FIGS. 7 and 8.

Figure 7:
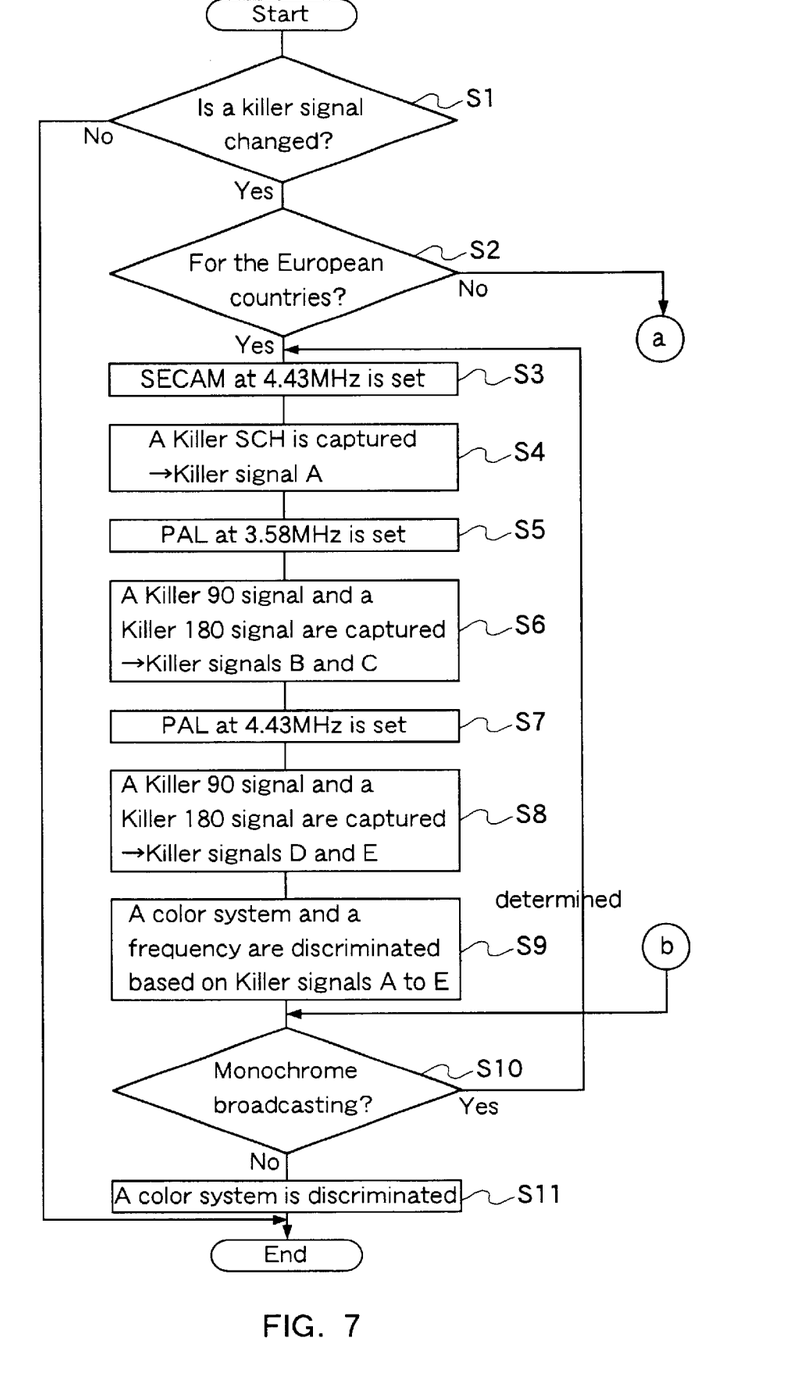
FIG. 7 is a flow chart showing software processing in a color transmission system discrimination circuit in Embodiment 2 of the present invention.
Figure 8:
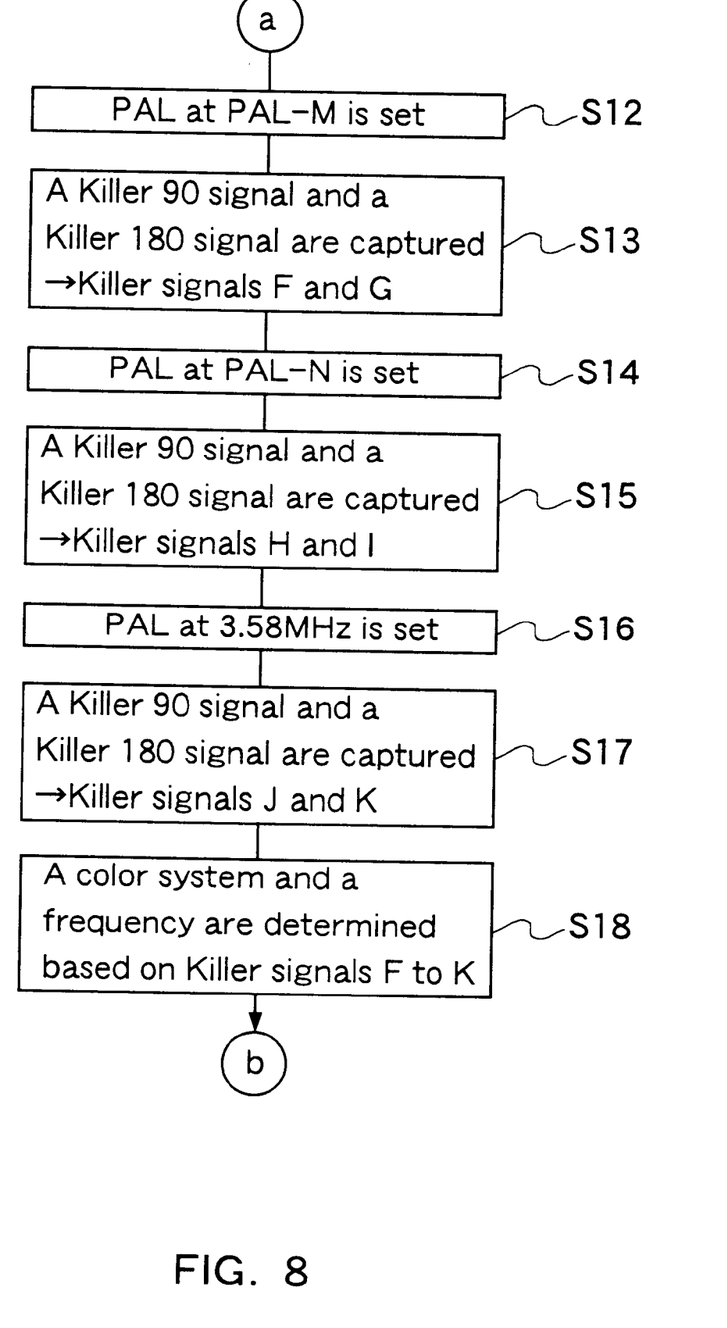
FIG. 8 is a flow chart showing software processing in the color transmission system discrimination circuit in Embodiment 2 of the present invention.

At Step S1 in FIG. 7, it is checked whether or not a killer signal is changed. This corresponds to the function of the killer state change detection circuit 23 in Embodiment 1 shown in FIG. 1. Next, at Step S2, it is detected whether or not a color transmission system is for the European countries. If it is for the European countries, Step S3 and the subsequent steps are conducted. If it is not for the European countries, i.e., if it is for South America, Step S12 and the subsequent steps in FIG. 8 are conducted. Whether or not it is for the European countries is previously set by switching on a receiver basis by a dip switch or the like.

At Step S3 in FIG. 7, the SECAM system at 4.43 MHz is set in the first stage. After a predetermined delay time (not shown), a killer SCM signal is captured at Step S4, and stored as a killer signal A.

Next, at Step S5, the PAL system at 3.58 MHz is set in the second stage. After a predetermined delay time (not shown), a killer 90 signal and a killer 180 signal are captured at Step S6, and stored as killer signals B and C.

Next, at Step S7, the PAL system at 4.43 MHz is set in the third stage. After a predetermined delay time (not shown), a killer 90 signal and a killer 180 signal are captured at Step S8, and stored as killer signals D and E.

At Step S9, based on the above-mentioned killer signals A to E, a color system and a frequency are determined in accordance with Table 7.

TABLE 7

| Killer signal A | B | C | D | E | Color system | Frequency |
| --- | --- | --- | --- | --- | --- | --- |
| * | * | * | H | H | PAL | 4.43 |
| * | * | * | L | H | NTSC | 4.43 |
| * | H | H | * | L | PAL | 3.58 |
| * | L | H | * | L | NTSC | 3.58 |
| H | * | L | * | L | SECAM | 4.43 |
| L | * | L | * | L | Monochrome | 3.58 |

At Step S10, it is checked whether or not a discrimination result is monochrome broadcasting. In the case where the result is monochrome broadcasting, the process returns to Step S3 of setting the first stage as described in Embodiment 1. As long as the result is monochrome broadcasting, the loop of Steps S3 to S10 is repeated. In the case where the result is not monochrome broadcasting, a color transmission system is determined as a result of discrimination (Step S11), and switching of various settings of a circuit as described above is performed.

At Step S12 and the subsequent steps in FIG. 8, the same processing is conducted with respect to the sets for the South America. First, at Step S12, the PAL system at the PAL-M frequency is set in the first stage. After a predetermined delay time (not shown), a killer 90 signal and a killer 180 signal are captured at Step S13, and stored as killer signals F and G.

Next, at Step S14, the PAL system at the PAL-N frequency is set in the second stage. After a predetermined delay time (not shown), a killer 90 signal and a killer 180 signal are captured at Step S15, and stored as killer signals H and I.

Then, at Step S16, the PAL system at 3.58 MHz is set in the third stage. After a predetermined delay time (not shown), a killer 90 signal and a killer 180 signal are captured at Step S17, and stored as killer signals J and K.

At Step S18, a color system and a frequency are determined in accordance with Table 8, based on the above-mentioned killer signals F to K.

TABLE 8

| Killer signal F | G | H | I | J | K | Color system | Frequency |
| --- | --- | --- | --- | --- | --- | --- | --- |
| * | * | * | * | H | H | PAL | 3.58 |
| * | * | * | * | L | H | NTSC | 3.58 |
| * | * | H | H | * | L | PAL | PAL-N |
| * | * | L | H | * | L | NTSC | PAL-N |
| H | H | * | L | * | L | PAL | PAL-M |
| L | H | * | L | * | L | NTSC | PAL-M |
| * | L | * | L | * | L | Monochrome | 3.58 |

After Step S18, the process proceeds to Step S10 in FIG. 7.

In this manner, in the present embodiment, a color transmission system can be determined by software processing in the same way as in Embodiment 1. During the processing from the first stage to the third stage (i.e., during a period of time before a color transmission system which is being received is correctly determined), it is preferable to switch settings for preventing disturbance of a screen and appearance of a color noise by setting of a provisional system in the same way as in Embodiment 1.

Two embodiments of the present invention have been described. According to the present invention, these embodiments may be appropriately modified. For example, Embodiment 1 may be combined with Embodiment 2, whereby both a portion using hardware and a portion using software are allowed to be present.

INDUSTRIAL APPLICABILITY

According to the present invention, color killer signals are detected in both a 180° phase and a 90° phase, and a color killer signal in the SECAM system is added thereto. A color transmission system is determined by using these three kinds of color killer signals. Therefore, a color transmission system which is being received can be exactly and rapidly determined, and required switching of settings can be automatically conducted.

What is claimed is:

1. A color transmission system discrimination circuit in a television receiver capable of receiving a plurality of television systems, comprising:
    a 180° killer signal detection portion for detecting the presence/absence of a burst signal in a 180° phase and outputting a first color killer signal;
    a 90° killer signal detection portion for detecting the presence/absence of a burst signal in a 90° phase and outputting a second color killer signal;
    a SECAM killer signal detection portion for detecting the presence/absence of a SECAM discrimination signal corresponding to a SECAM system and outputting a third color killer signal; and
    a discrimination processing portion for conducting processing for determining a color system which is being received and a frequency of a reference sub-carrier signal, using the first to third color killer signals,
    wherein the discrimination processing portion includes:
        a killer state change detection circuit for detecting a change in a color killer signal;
        a sequencer which is driven with an output signal of the killer state change detection circuit, and performs a first stage for setting a provisional color transmission system, a second stage for setting a provisional color transmission system different from that in the first stage, and a third stage for setting a provisional color transmission system different from those in the first and second stages in this order respectively for a predetermined period of time;

a first latch circuit for capturing and latching a required signal among the first, second, and third color killer signals obtained in the first stage;

a second latch circuit for capturing and latching a required signal among the first, second and third color killer signals obtained in the second stage; and a discrimination decoder for capturing a required signal among the first, second, and third color killer signals obtained in the third stage and outputting a discrimination signal of a color system and a discrimination signal of a frequency of a reference sub-carrier signal, based on the captured signal and an output signal of the first and second latch circuits.

2. A color transmission system discrimination circuit according to claim 1, further comprising: a third latch circuit for latching a discrimination signal output from the discrimination decoder, a mode setting circuit for provisionally setting a color transmission system in each of the stages; and a switch for selecting an output of the latch circuit or an output of the mode setting circuit as an output signal for setting a color transmission system, wherein the switch selects an output of the mode circuit in the first to third stages, the switch selects an output of the latch circuit in a fourth stage following the third stage, and a color transmission system is set by switching based on a discrimination signal from the discrimination decoder in the fourth stage.

3. A color transmission system discrimination circuit according to claim 2, wherein in a case where a discrimination signal output from the discrimination decoder represents monochrome broadcasting, the sequencer returns to the first stage without performing the fourth stage.

4. A color transmission system discrimination circuit according to claim 1, which provisionally sets a system in the first to third stages and captures a color killer signal thus obtained by using a software program, and successively determines a color system and a frequency of a reference sub-carrier signal, based on the captured color killer signal.

5. A color transmission system discrimination circuit according to claim 3, further comprising means for, in the first to third stages, fixing a trap frequency of a trap filter circuit for removing a color signal component from a video signal, fixing a color demodulation circuit to a PAL/NTSC circuit or a SECAM circuit, and setting a color level of the color demodulation circuit and a color amplifier at a minimum value.

6. A color transmission system discrimination circuit according to claim 1, wherein a color transmission system is provisionally set in the second stage so as to have higher priority compared with the first stage, and a color transmission system is provisionally set in the third stage so as to have higher priority compared with the second stage.

7. A color transmission system discrimination circuit in a television receiver capable of receiving a plurality of television systems, comprising:

a 180° killer signal detection portion for detecting the presence/absence of a burst signal in a 180° phase and outputting a first color killer signal;

a 90° killer signal detection portion for detecting the presence/absence of a burst signal in a 90° phase and outputting a second color killer signal;

a SECAM killer signal detection portion for detecting the presence/absence of a SECAM discrimination signal corresponding to a SECAM system and outputting a third color killer signal; and a discrimination processing portion for determining a color system which is being received and a frequency of a reference sub-carrier signal, using the first to third color killer signals, wherein the discrimination processing portion detects a change in at least one of the first to third color killer signals, so as to start the discrimination processing.

* * * * *